(12) United States Patent
Shaffer et al.

(10) Patent No.: US 11,611,226 B1
(45) Date of Patent: Mar. 21, 2023

(54) MARINE BATTERY CHARGER AND POWER SUPPLY SYSTEM WITH STATUS INDICATOR PLUG END

(71) Applicant: Brunswick Corporation, Mettawa, IL (US)

(72) Inventors: Benjamin C. Shaffer, Bedford, NH (US); Gerald J. Demirjian, Auburn, NH (US); Ximing He, Auburn, NH (US); Brandon J. Stafford, Manchester, NH (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/523,686

(22) Filed: Nov. 10, 2021

(51) Int. Cl.
| | | |
|---|---|---|
| *H02J 7/00* | (2006.01) | |
| *H02J 7/02* | (2016.01) | |
| *B60L 53/60* | (2019.01) | |
| *B60L 53/18* | (2019.01) | |
| *B60L 53/30* | (2019.01) | |

(52) U.S. Cl.
CPC ............ *H02J 7/0047* (2013.01); *B60L 53/18* (2019.02); *B60L 53/30* (2019.02); *B60L 53/60* (2019.02); *H02J 7/0042* (2013.01); *H02J 7/02* (2013.01); *H02J 2310/42* (2020.01)

(58) Field of Classification Search
CPC ............ H01R 13/7175; H01R 13/641; H01R 13/6691; H01R 13/717; H01R 31/06; H01R 31/065; H01R 2201/26; H02J 7/0042; H02J 7/0047; H02J 7/02; H02J 2310/42; Y02T 90/14; Y02T 90/12; Y02T 10/7072; B60L 53/16; B60L 53/18; B60L 53/305; B60L 2200/32; H01B 9/00; H01B 9/003; H01B 9/005
See application file for complete search history.

(56) References Cited

U.S. PATENT DOCUMENTS

| | | | |
|---|---|---|---|
| 3,942,859 | A | 3/1976 | Korodi |
| 4,118,690 | A | 10/1978 | Paynton |
| 4,671,597 | A | 6/1987 | Grill |
| 5,207,594 | A | 5/1993 | Olson |
| 7,121,707 | B2 | 10/2006 | Currie et al. |
| 7,544,909 | B2 | 6/2009 | Dhir |
| 7,952,487 | B2 | 5/2011 | Montebovi |
| 8,125,324 | B2 | 2/2012 | Frey et al. |
| 9,457,791 | B2 | 10/2016 | Vitale et al. |
| 9,912,081 | B2 | 3/2018 | Corona |
| 2009/0160427 | A1* | 6/2009 | Drake .............. G01R 19/16566 324/72 |

(Continued)

*Primary Examiner* — Ryan Johnson
(74) *Attorney, Agent, or Firm* — Andrus Intellectual Property Law, LLP

(57) ABSTRACT

A marine battery charger system configured to be installed on a marine vessel to charge a marine battery includes a housing, a charging circuit in the housing configured to receive AC power and to output a charge current to the marine battery, and a cord. The cord has a plug end configured to engage an AC power outlet and is configured to transmit the AC power from the AC power outlet to the charging circuit. A controller is configured to control a charging operation mode of the charging circuit and a status indicator is located at the plug end of the cord and configured to be controlled by the controller to indicate the charging operation mode of the charging circuit.

23 Claims, 7 Drawing Sheets

(56) References Cited

U.S. PATENT DOCUMENTS

2012/0062385 A1* 3/2012 Wiesemann ......... H01R 13/717
  439/345
2012/0156923 A1  6/2012  Gao
2019/0148785 A1  5/2019  Austin

* cited by examiner

MARINE BATTERY CHARGER AND POWER SUPPLY SYSTEM WITH STATUS INDICATOR PLUG END

FIELD

The present disclosure generally relates to power supply systems, such as marine battery charger systems, and more particularly to power supply systems having a status indicator at a plug end that indicates an operation mode of the respective power supply system.

BACKGROUND

Power supply systems, such as battery charger systems and inverter systems, are configured to distribute power received at a power outlet or connection point to a power source, which in various embodiments may be an alternating current (AC) or a direct current (DC) source. For example, the power outlet may be an AC power outlet that connects to electricity supplied by a power grid. Various power socket arrangements are available for connection to power, such as AC outlets, and corresponding plug standards are configured to mate with those sockets to receive power that conforms to a corresponding standard. Various standards are established for mains electricity, or utility power, including a nominal voltage and a frequency. In much of the world, electric power supplied by mains electricity, or utility power, is at a voltage (nominally) of 230 volts and at a frequency of 50 hertz. In North America, AC electric power is typically provided at a frequency of 60 hertz and either 120 volts (most common) or 230 volts. Non-interchangeable plugs and sockets are established for different power supply standards, which provide some protection from accidental use of appliances with incompatible voltage and/or frequency requirements.

Various power supply devices and systems are configured to connect to AC power outlets and to distribute electrical power to loads at an appropriate voltage and frequency. For example, battery chargers are configured to receive AC power by connection to an AC power outlet and to deliver DC power to charge a battery. Inverters are another exemplary power supply system, which is a system that changes a DC input to AC. Power inverters are often used in electrical power applications where high currents and voltages are present. Other types of power supply systems that include converters (including AC/DC and DC/DC), rectifiers, voltage regulators, voltage converters, and the like are well known in the art.

Many power supply systems include an internal controller that controls the internal power supply circuit to operate in different power delivery modes. Battery chargers, for example, are typically configured to operate in a plurality of modes based on the voltage or state of charge of the battery being charged. This plurality of modes typically includes at least a bulk mode where bulk charge is delivered to the battery, and a float mode where the battery is fully charged, and the charger is operating to only deliver power as needed to maintain the battery in the fully charged state. The plurality of modes may further include an absorption mode, or conditioning mode, where the battery is taken from a nearly charged state or voltage level to fully charged. These battery charger operation modes and functions, as well as others, are well known in the relevant art.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a marine battery charger system configured to be installed on a marine vessel to charge a marine battery includes a housing, a charging circuit in the housing configured to receive AC power and to output a charge current to the marine battery, and a cord. The cord has a plug end configured to engage an AC power outlet and is configured to transmit the AC power from the AC power outlet to the charging circuit. A controller is configured to control a charging operation mode of the charging circuit and a status indicator is located at the plug end of the cord and configured to be controlled by the controller to indicate the charging operation mode of the charging circuit.

For example, the charging operation mode includes at least one of a bulk mode, an absorption mode, or a float mode, and the status indicator is configured to variously illuminate to indicate when the charging circuit is operating in the bulk mode, the absorption mode, or the float mode.

For example, the marine battery charger system may further comprise a status indicator circuit that includes the status indicator in the plug end, a control section in the housing configured to control illumination of the status indicator, and at least two wires connecting between the control section and the status indicator.

For example, the marine battery charger system may further comprise a status indicator circuit that includes the status indicator in the plug end, wherein the status indicator circuit is electrically isolated from the AC power from the AC power outlet and from the charging circuit.

One embodiment of a power supply system configured to distribute power from a power source and includes a power supply device in a housing and configured to distribute an electrical power received from the power source and the cord. The cord has a plug end having a length extending between the housing and the plug end and includes power conductors extending the length of the cord and configured to conduct power to or from the power supply device. The system further includes a status indicator circuit that is electrically isolated from the power conductors and extends the length of the cord. The status indicator circuit includes at least a first indicator light and a second indicator light located at the plug end of the cord. A controller is configured to control the status indicator circuit to selectively illuminate the first indicator light when the power supply device is operating in a first operation mode and to illuminate the second indicator light when the power supply device is operating in the second operation mode.

In one example, a controller is configured to control more status indicator circuits to selectively illuminate more indicator lights when the power supply device is operating in other operation modes. For instance, the controller may be configured to control the status indicator circuit to rapidly cycle between illuminating the first indicator light and the second indicator light when the power supply device is operating in a third operation mode.

In another example, the power supply system is a marine battery charger system configured to be installed on a marine vessel to charge a marine battery, and wherein the first mode is a bulk mode delivering a bulk charge to the marine battery and the second mode is a float mode delivering a float charge to the marine battery. For instance, the status indicator circuit may be configured to illuminate the first indicator light to indicate that the marine battery charger system is operating in a bulk mode and to illuminate the second indicator light to indicate that the marine battery charger system is operating in a float mode. The status indicator may further be controllable to cycle between illuminating the first indicator light and the second indicator light to indicate that the charger device is in an absorption mode.

In one example, the status indicator circuit includes a first switching device configured to allow current to flow through the status indicator circuit in a first direction to illuminate the first indicator light and a second switching device configured to allow current to flow through the status indicator circuit in a second direction to illuminate the second indicator light.

In a further example, the first and second switching devices are in the control section of the status indicator circuit located in the housing and are each controlled by the controller.

In a further example, the controller is configured to control the first switching device to illuminate the first indicator light to indicate a first operation mode, control the second switching device to illuminate the second indicator light to indicate a second operation mode, and to control both the first and second switching devices to illuminate both the first and second indicator lights to indicate a third operation mode.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
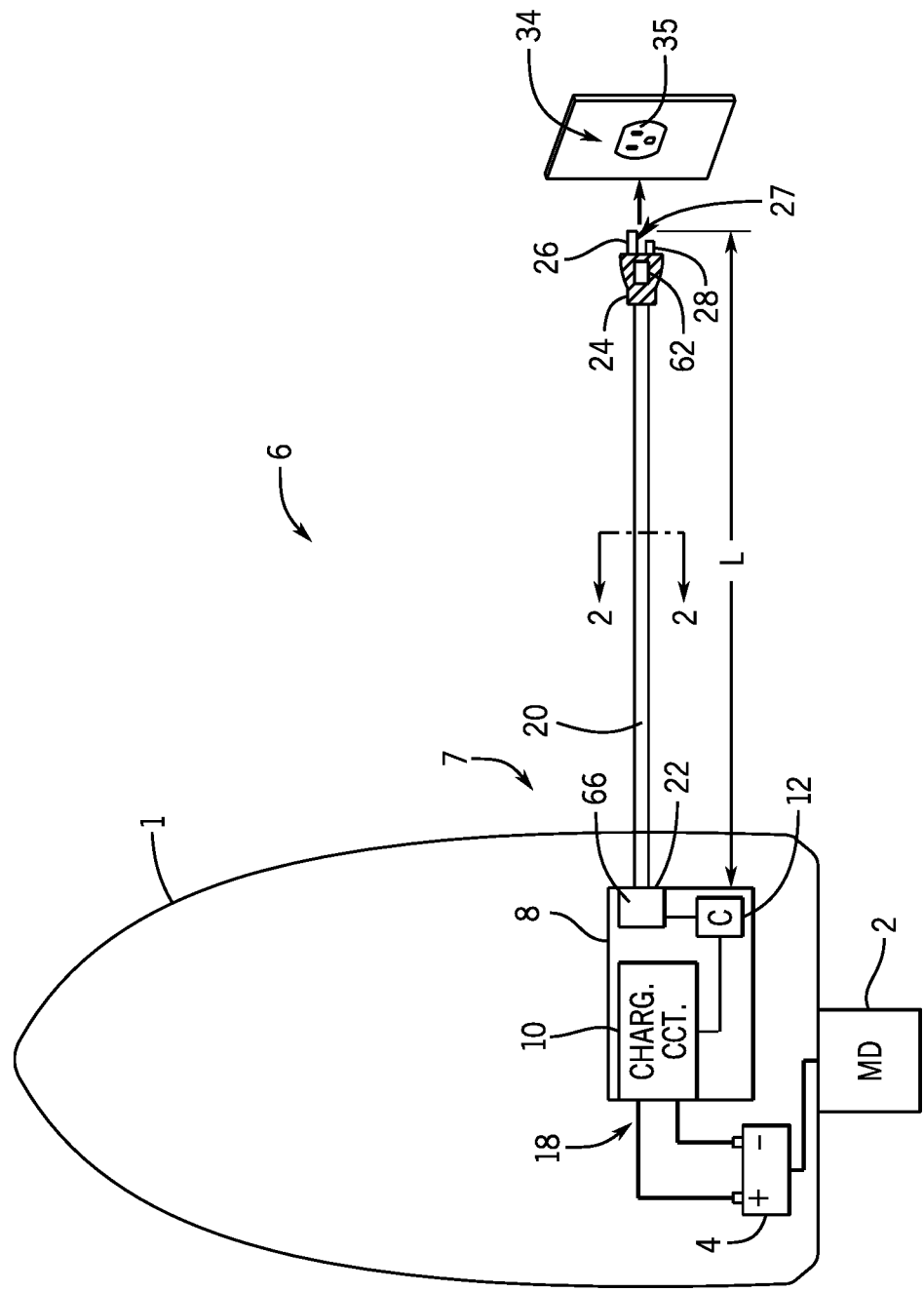
FIG. 1 depicts an exemplary battery charger system configured to be installed on a marine vessel in accordance with one embodiment of the present disclosure.

The present inventors have recognized a problem with existing power supply systems is that they are often installed in locations that are challenging to access to check the operation mode or status thereof. For example, prewired battery chargers are typically installed on marine vessels inside an enclosed space within the hull, such as covered by a door or hatch. Thus, monitoring the operation mode, or charging status, of a prewired battery charger installed on a marine vessel can be difficult, particularly if the vessel is sitting covered because it requires accessing the body of the prewired battery charger which is buried in the hull of the vessel. Thus, it can be difficult for boat owners to monitor the charge status of their batteries during the charging process.

In view of the foregoing challenges and problems in the relevant art, the present inventors developed the disclosed system having a status indicator located at the plug end of a cord for a marine battery charger or other power supply system. The power supply system includes a power supply device, such as a marine battery charger, in a housing and cord having a plug end, such as configured to engage an AC power outlet in the case of a charger or to provide an AC power output connector in the case of an inverter, and a length extending between the plug end and the housing. A status indicator is located at the plug end of the cord and configured to indicate the operation mode of the power supply device between at least a first operation mode and a second operation mode. Accordingly, the system provides a status indicator in an easily viewed location where a user routinely interacts and can easily monitor the operation of the power supply device, such as the battery charger, despite not being able to see the device housing or the location where the power distribution, such as battery charging, is occurring.

In one embodiment, the system includes a status indicator circuit that is electrically isolated from the power conduction wires in the cord conducting power from the power source to the power supply device from the power supply device to a load connected to the plug end. The status indicator circuit extends the length of the cord from the device end to the plug end. It includes a control section at the device end or in the housing of the power supply device and the status indicator in or near the plug end.

The status indicator may include at least a first indicator light and a second indicator light that are separately illuminable to indicate that the power supply device is operating in either a first operation mode or a second operation mode. In an example where the power supply device is a battery charger, the status indicator may be configured to illuminate the first indicator light to indicate a bulk mode where the battery charger is delivering a bulk charge to a battery, and a float mode where the battery charger is delivering a float charge (which may be little or no current) to the battery.

In some embodiments, the status indicator may be configured to indicate additional operation modes of the power supply device. Referring again to the battery charger embodiment, the status indicator may further be configured to indicate that the battery charger is operating in an absorption mode or conditioning mode. Alternatively or additionally, the status indicator may be configured to indicate that the battery charger or other power supply device has generated a fault, and this is not operating at all.

FIG. 1 depicts an exemplary marine battery charger system 6 configured to be installed on a marine vessel 1 to charge a marine battery 4. The marine battery charger system 6 includes marine battery charger 7 and a cord 20. The charger 7 comprises a charging circuit 10 encased in a housing 8 and configured to receive AC power from an AC power outlet 34 and to output a charge current, which is generally DC, to the marine battery 4. The housing 8 is an enclosure, such as made of plastic or metal, configured to protect and isolate the charging circuit 10 and to connect to cord 20. The housing 8 may be configured to be fastenable (e.g., by screws, hooks, Velcro, or other fastening means) to a structure within the vessel such that the marine battery charger is fixed in place on the vessel 1. The charger system 6 includes a cord 20 and a plug end 24 configured to engage the AC power outlet 34, and specifically the socket 35 of the AC power outlet 34. The cord 20 has a length L (e.g., six feet or longer) extending from the plug end 24 to the housing 8.

Figure 2:
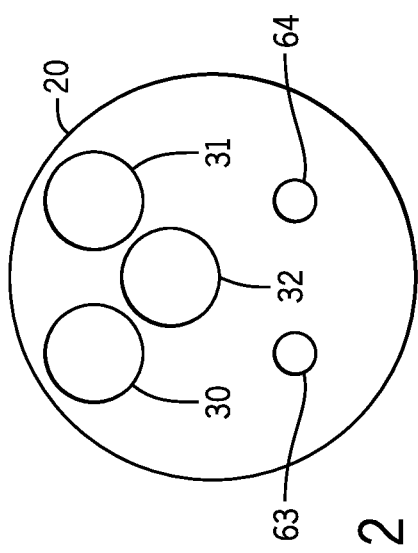
FIG. 2 depicts a cross-sectional view of the cord in FIG. 1 in accordance with an exemplary embodiment.

FIG. 2 depicts a cross-sectional view of cord 20, which in this example includes three power conductor wires 30-32, including a hot conductor 30, neutral conductor 31, and a ground line 32. For example, the conductors 30-32 may be configured to conduct mains electricity to the charger 7. Wires 63 and 64 for the status indicator circuit also run alongside the power conductors 30-32, as discussed in more detail below. The power conductors 30-32 connect to prongs 26-28 that get inserted into the power socket 35 of the power outlet 34. The prongs 26-28 on the plug end 24 include, for this depicted embodiment, a first prong 26 configured to connect to the hot electrical connector in the AC power outlet, a second prong 27 configured to connect to the neutral connector in the AC power outlet, and a ground prong 28 configured to connect to a ground line in the AC power outlet.

The cord 20 has a device end 22 that connects to the marine battery charger 7, such as to the housing 8 thereof. Power conducted by the power conductors 30-32 is received at the charging circuit 10, which is configured to modify the voltage, current, or both to deliver a charge current 18 to the battery 4. For example, the battery charger system 7 may be configured to convert the AC power input to a DC output power delivered to the battery 4. The battery 4 may be configured to power a marine drive 2 on the marine vessel, such as an electric trolling motor or other electric motor. Alternatively or additionally, the marine battery 4 may be configured to power other devices on the marine vessel, such as steering systems, engine starter(s), inverters, navigation systems, other house loads, etc. As will be understood by a person of ordinary skill in the art, the battery 4 may be a single battery, such as a lead-acid battery or a lithium-ion battery, or may be a bank of batteries.

The battery charger system 7 includes a controller 12 configured to control a charging operation mode of the charging circuit 10. For example, the charging operation mode may be controlled based on the charge status of the battery 4 (e.g., battery voltage or battery state of charge) and may include at least a bulk mode, an absorption mode (sometimes referred to as conditioning), and a float mode where the battery is fully charged and is being maintained. Alternative or additional modes may be generated by the controller 12, such as a fault mode where a fault condition is detected and the charging circuit 10 is either disabled or operated in an altered or limited capacity. In still other examples, alternative or additional modes may include analyze mode where the controller is forming status check or communication tasks, auto maintain maintenance mode wherein the charger is maintaining a charge state of a battery, sleep mode where the charger is off or is otherwise not delivering a charge, or the like.

Operation modes of the controller 12 may be indicated by the status indicator 62 located at or near, such as adjacent to, the plug end 24 of the cord 20. The status indicator 62 is visible to a user when looking at the plug end 24. Thus, the status indicator 62 is configured to provide an accessible and easily understood indication of the charging operation mode performed by the charging circuit 10 even though the battery charger is not visible to the user. The controller 12 directly or indirectly controls the status indicator 62 located at or adjacent to the plug end 24. In one embodiment, a status indicator circuit 60 is controllable, such as by the controller 12 in the charger housing 8, to selectively activate the status indicator 62 at or near the plug end 24.

In one embodiment, the status indicator 62 includes a plurality of indicator lights that are separately illuminable to indicate operation status of the charger 7 or other power supply device. The status indicator 62 may be embedded into a body, or housing, of the plug end 24, 54 (FIG. 3), such as molded into the rubber or plastic housing from which the prongs 26-28, 56-57 extend. In one embodiment, the body of the plug end 24, 54 is comprised of a translucent or transparent plastic material and the status indicator 62 includes at least two differently colored indicator lights embedded in the plastic such that, when illuminated, some or all of the body of the plug end 24, 54 is illuminated. Such an embodiment is represented in FIG. 1, where the body of the plug end 24 is illuminated in a green color to indicate that the battery charger 7 is operating in a first mode. In other embodiments, only a portion of the plug end 24, 54 may be illuminable, such as a portion of the body. Alternatively, the indicator lights of the status indicator 62 may be on or near the surface of the body of the plug end 24, 54 and visible through a small window or clear housing over the LED. In still other embodiments, the status indicator 62 may be adjacent to the body of the plug end 24, 54, such as in a separate housing that is next to or toward the plug end 24, 54 on the cord 20 such that it is visible by a user when the plug end 24, 54 is plugged into a power outlet or is connected to an AC load.

Figure 3:
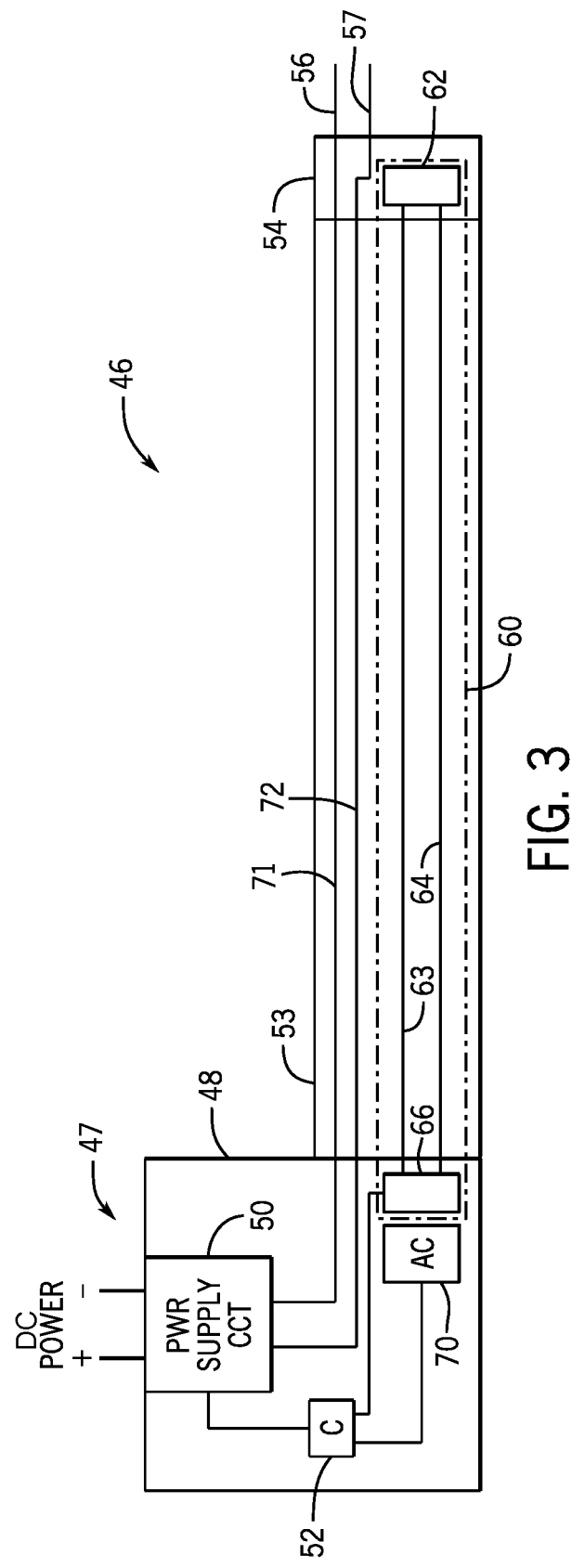
FIG. 3 depicts an exemplary power supply system configured to distribute power from an outlet in accordance with another embodiment of the present disclosure.
Figure 4:
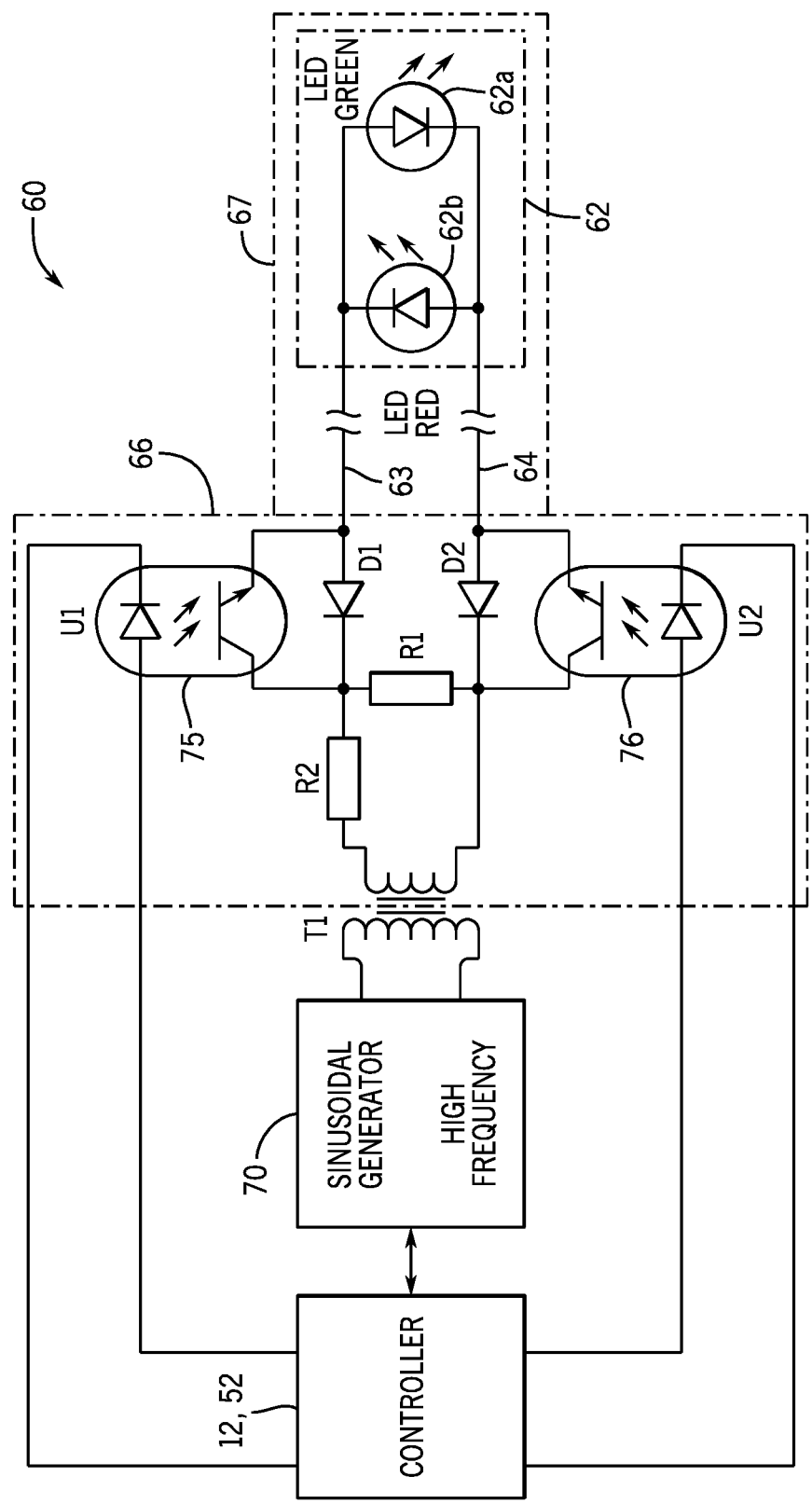
FIG. 4 depicts an exemplary embodiment of a status indicator circuit in accordance with one embodiment of the present disclosure.

As further illustrated in FIGS. 3-4, the status indicator circuit 60 may include a control section 66 in the housing 8 or at the device end 22 of the cord 20 that is configured to interface with the controller 12 to control illumination of the status indicator 62. At least two wires 63 and 64 run substantially the length L of the cord 20. The wires 63 and 64 connect between the control section 66 in the charger housing 8 and the status indicator 62 in or near the plug end 24. In one embodiment, the status indicator circuit 60 is configured as a low voltage circuit and the wires 63 and 64 have a significantly smaller diameter than the power conductors 30-32. The use of smaller diameter wires is beneficial in some embodiments because it reduces the overall diameter of the cord 20. However, in other embodiments the wires 63 and 64 may be the same diameter as the power conductor wires 30-32. To provide just one example, wires 63 and 64 may have a diameter that is less than half the diameter of the power conductors 30-32.

The status indicator circuit 60 may be electrically isolated from the power conductors 30-32 in the cord 20 and from the charger circuit 10. In many applications, electrical isolation is a very important safety measure. For example, if there is a short in the cord 20 and/or within the status indicator circuit 60, it will not expose electronics or circuitry within the charger system 6 to high voltage power provided by the AC power outlet. For example, the cord 20 may provide a high risk of short, where the relatively thin wires 63 and 64 of the status indicator circuit 60 run alongside the relatively thick power conductors 30-32. Cords are often exposed to bending and crushing that could end up breaking one or more of the wires 30-32 and 63-64 causing a short. So long as the status indicator circuit 60 is electrically isolated, it will not cause inadvertent power transmission to low voltage elements, such as the controller 12, within the charger housing 8.

The isolated status indicator circuit 60 is powered and controlled such that there is no direct conduction path between the status indicator circuit 60 and the power conductors 30-32 or the circuit 10, 50. As discussed further below with respect to the examples shown at FIG. 4, the status indicator circuit 60 may be powered by a transformer controlled by an AC generator 70, such as a high-frequency generator. Other arrangements for powering the status indicator circuit 60 are depicted at FIGS. 5-8. Additionally, any control switching contained within the control section 66 of the status indicator circuit 60 may also be isolated. For example, opto-isolators may be utilized to provide a control connection between the controller 12, 52 and the control section 66 to control the status indicator, such as to control which indicator light gets illuminated and when.

FIG. 3 depicts an embodiment where the power supply system 46 includes a power supply device 47 contained in a housing 48 and configured to distribute electrical power received from a power outlet configured to provide a connection to a power supply. The above-described marine battery charger system 6 is one exemplary embodiment of a power supply system 46. In other embodiments, the power supply device 47 may be another device configured to modify input power provided from an outlet and distribute the modified electrical power. To provide one example, the power supply device 47 may be a power inverter configured to output AC power at plug end 54 from a DC power input.

The power supply system 46 includes a cord 53 having a plug end 54. In the charger embodiment, the plug end 54 is configured to engage a power outlet. In other embodiments, the plug end 54 may be on the output side and configured to connect to a load to provide power. Where the system 46 is an inverter, the plug end 54 may be the output end configured to provide AC power output.

The cord 53 has a length L extending from the housing 48 to the plug end 54. The cord 53 may include power conductors 71 and 72 extending along the length of the cord 53 and configured to conduct power from the outlet, or source, to the power supply device 47, and more particularly to the power supply circuit 50. For example, the conductors 71 and 72 include a positive power conductor 71 that terminates at the prong 56 configured to connect to a positive port or terminal at the outlet, and a second power conductor 72 that connects to and terminates at a second prong 57 configured to connect to a neutral or negative terminal at the outlet. In certain embodiments, a ground line may also be provided, such as exemplified in the embodiment shown in FIGS. 1 and 2. The plug end 54 and prongs 56-57 may be according to any standard configuration for connecting to an electrical power source.

The power supply circuit 50 is controlled by a controller 52 to operate in one of a plurality of operation modes. Various modes for a battery charger are described above. Where the power supply device 47 is an inverter, for example, the operation modes of the power supply circuit controlled by the controller 52 may include modes based on load capacity remaining, battery charge status (e.g., state of charge), battery health, communication status, or the like. In such embodiments, the status indicator 62 may be controlled by the controller 52 to provide the user information regarding the level of energy remaining in the battery serving as the DC power source to show the amount of power available from the inverter. For example, the status indicator could turn from green to yellow (e.g., by a third LED or by alternating red and green as described below) when the battery reaches a first threshold charge, and then from yellow to green when the battery reaches a second lower threshold charge level. As described above, system 46 includes a status indicator circuit 60, which may be electrically isolated from the power conductors in the cord 53 and from the power supply circuit 50. In embodiments where the status indicator circuit 60 is isolated, it is coupled to a power source in housing 48 without the use of direct wire connections. For example, the status indicator circuit 60 may be powered by an AC generator via a transformer. Other arrangements for powering the status indicator circuit 60 are depicted at FIGS. 5-8.

FIG. 4 depicts one embodiment of a status indicator circuit 60. The generator 70 is controlled by the controller for the power supply device 47, such as controller 12 or controller 52 described above with respect to FIGS. 1 and 3, respectively. Generator 70 is a high-frequency generator, but other embodiments may generate a lower frequency. Controller 12, 52 also controls at least two switching devices 75 and 76 in order to control the status indicator 62. In the depicted example, the first switching device 75 is configured to allow and disallow current to flow through the status indicator circuit 60 in a first direction to turn on and off the first indicator light 62a. The second switching device 76 is configured to allow/disallow current to flow through the status indicator circuit in a second direction, opposite the first direction, to illuminate/turn off the second indicator light 62b.

In the depicted embodiment, the status indicator circuit 60 is configured such that when both the first switching device 75 and the second switching device 76 are enabled or otherwise positioned to allow current to flow through the status indicator circuit in the respective direction, the first indicator light 62a and the second indicator light 62b alternately illuminate at the frequency of the AC power supplied by the AC generator 70 and transformer T1.

In certain embodiments, the first indicator light 62a and the second indicator light 62b may be different colors from one another. In the example at FIG. 4 the first indicator light 62a is green (such as a green LED) and thus emits a green-light, and the second indicator light 62b is red (such as a red LED) this emitting a red light. In other embodiments, different colors than red and/or green may be utilized. Still further embodiments, both the first indicator light 62a and the second indicator light 62b may be the same color. In such an embodiment, the plug end 24, 54 may have a housing with labels identifying corresponding modes or providing information such that a user can understand which operation mode is indicated by the indicator light 62a, 62b.

Where the first indicator light 62a and the second indicator light 62b are different colors from one another and the frequency of the AC generator 70 is sufficiently high, rapid cycling between illuminating the first indicator light 62a and the second indicator light 62b gives the appearance to the human eye that a third color light is being emitted. For example, where the AC generator is 50 or 60 hertz, the illumination cycling is sufficiently rapid to give the appearance of a third color that is a mix of the first and second colors. This rapid alternating of the first and second light indicators may be utilized to indicate a third operation mode. For instance, where the first indicator light 62a and the second indicator light 62b are red and green, rapid cycling therebetween appears as amber or yellowish, which may be utilized to indicate an additional mode. In certain embodiments, the AC generator 70 may preferably generate a frequency greater than 50 hertz. In one embodiment, the sinusoidal generator 70 is a high frequency generator that generates a 50 kHz signal, or any other frequency less than 100 kHz.

Alternatively or additionally, one or more indicator lights 62a, 62b may be controlled to indicate additional operation modes, such as to indicate that the power supply device 7, 47 has generated a fault and thus is operating in a reduced capacity or is not operating to supply power at all. For example, illumination of one or more of the indicator lights 62a, 62b may be controlled by the controller 12, 52 to blink in a predetermined pattern or frequency to indicate that the device 7, 47 is operating in a fault mode, such as to control current flow via the switches 75, 76.

The status indicator circuit 60 includes a control section 66 which is at the device end of the cord 20, 53 or within the housing 8, 48 of the power supply devices, and a cord section 67 which is in the cord 20, 53 and extends the length thereof. The control section 66 includes switches 75 and 76 and power-generation elements. The status indicator 62 is located at or adjacent to the plug end 24, 54, such as embedded in the plastic body of the plug end 24, 54, and includes one or more indicator lights. Wires 63 and 64 extend the length of the cord 20, 53 from the device end 22 to the plug end 24 and are variously sized depending on the lengths of the cord.

Each indicator light 62a, 62b in the status indicator 62 may be comprised of one or more LEDs. In the depicted embodiment, the status indicator includes two LEDs arranged so that they illuminate when current flows in opposite directions from one another—i.e., a first LED illuminates when the current flows in a first direction and a second LED illuminates when the current flows in the opposite direction. In the example at FIG. 4, the green LED of the first indicator light 62a illuminates when switching device 75 is turned on or operating to allow current to flow therethrough. The red LED of the indicator light 62b illuminates when current flows in the opposite direction due to the second switching device 76 being turned on or otherwise operating to allow current to flow in the opposite direction than that allowed by the first switching device. The first switching device 75 is paired with diode D1 which prevents current flow in the first direction unless switching device 75 is allowing current flow. The second switching device 76 is paired with diode D2 which likewise prevents current from flowing in the second direction unless the second switching device 76 is operating to permit current flow. Resister R1 is a large resistor that prevents energy build up when both switching devices 75, 76 are turned off. Resistor R2 is a much smaller resistor and is configured to limit the current flow through the indicator light 62a, 62b in the status indicator 62.

In the depicted example, the switching devices 75 and 76 are optoisolators U1 and U2, or optocouplers, each having a light source and a sensor separated by a dielectric barrier. The sensor is a photosensor, such as a phototransistor, configured to allow current to flow therethrough when light from the light source, or LED, is detected. Controller 12, 52 controls activation and deactivation of the LEDs in each of the optoisolators U1 and U2. Thereby, switching is controlled in a galvanically isolated way. In an alternative embodiment, the switching devices 75 and 76 may be MOSFETs.

Figure 5:
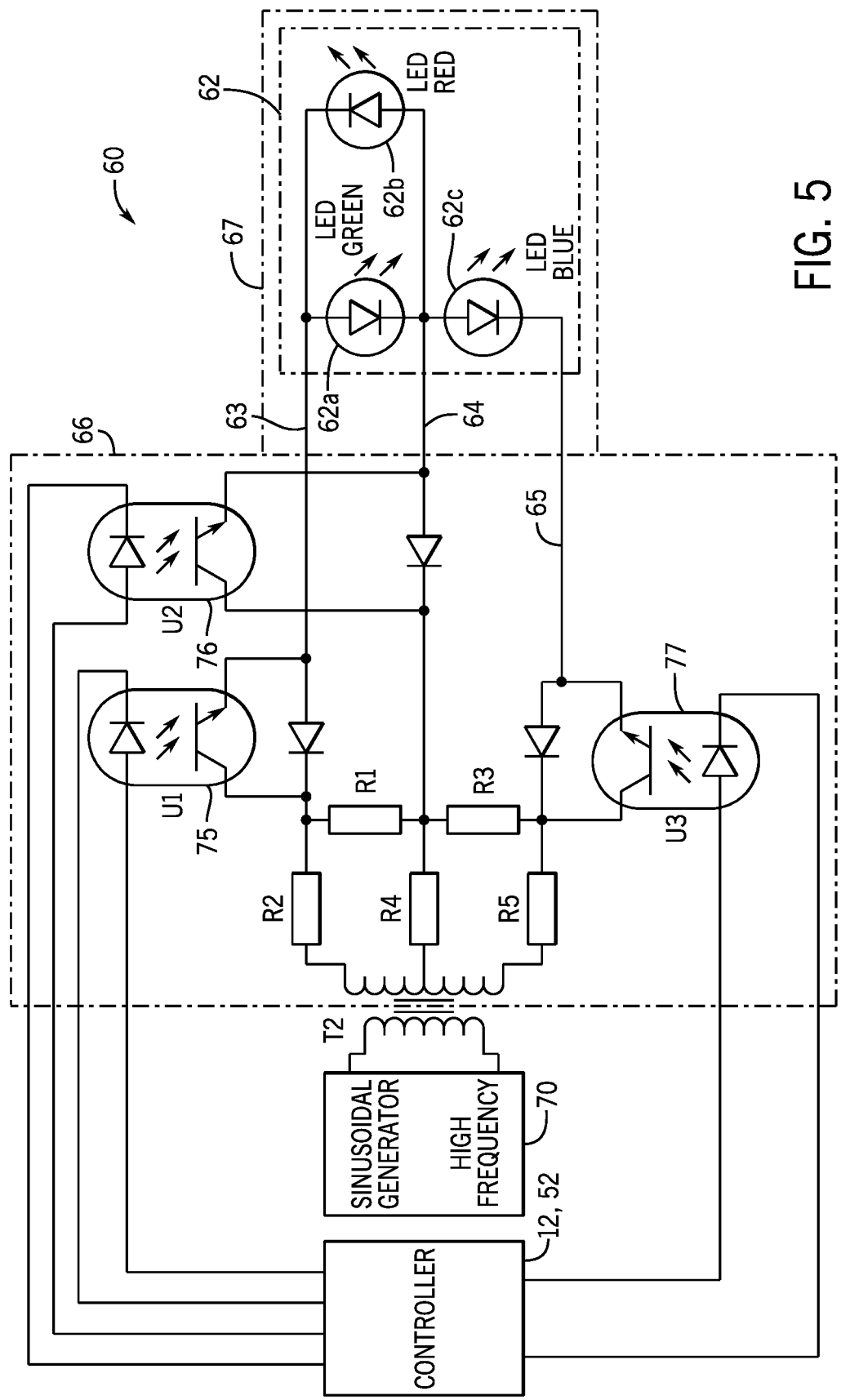
FIGS. 5-8 depict additional exemplary embodiments of status indicator circuits in accordance with the present disclosure.

FIGS. 5-8 depict additional embodiments of status indicator circuits 60. In these and other embodiments, the number of wires in the cord section 67 of the cable 20 may change, as may the requirements of transformers and other elements in the control section 66 of the circuit. Likewise, the number of indicator lights in the status indicator 62 may change. FIG. 5 depicts an example of an embodiment having a status indicator 62 with three indicator lights 62a-62c. Each indicator light 62a-62c is controlled by a corresponding switching device 75-77, which may optoisolators U1-U3 as described above. The cord section 67 of the circuit 60 includes three wires 63-65 extending from the device end to the status indicator 62 in the plug end. Several resistors R1-R5 are configured to prevent energy buildup and limit current flow, as will be understood by a person having ordinary skill in the art viewing the example diagram at FIG. 5.

Figure 6:
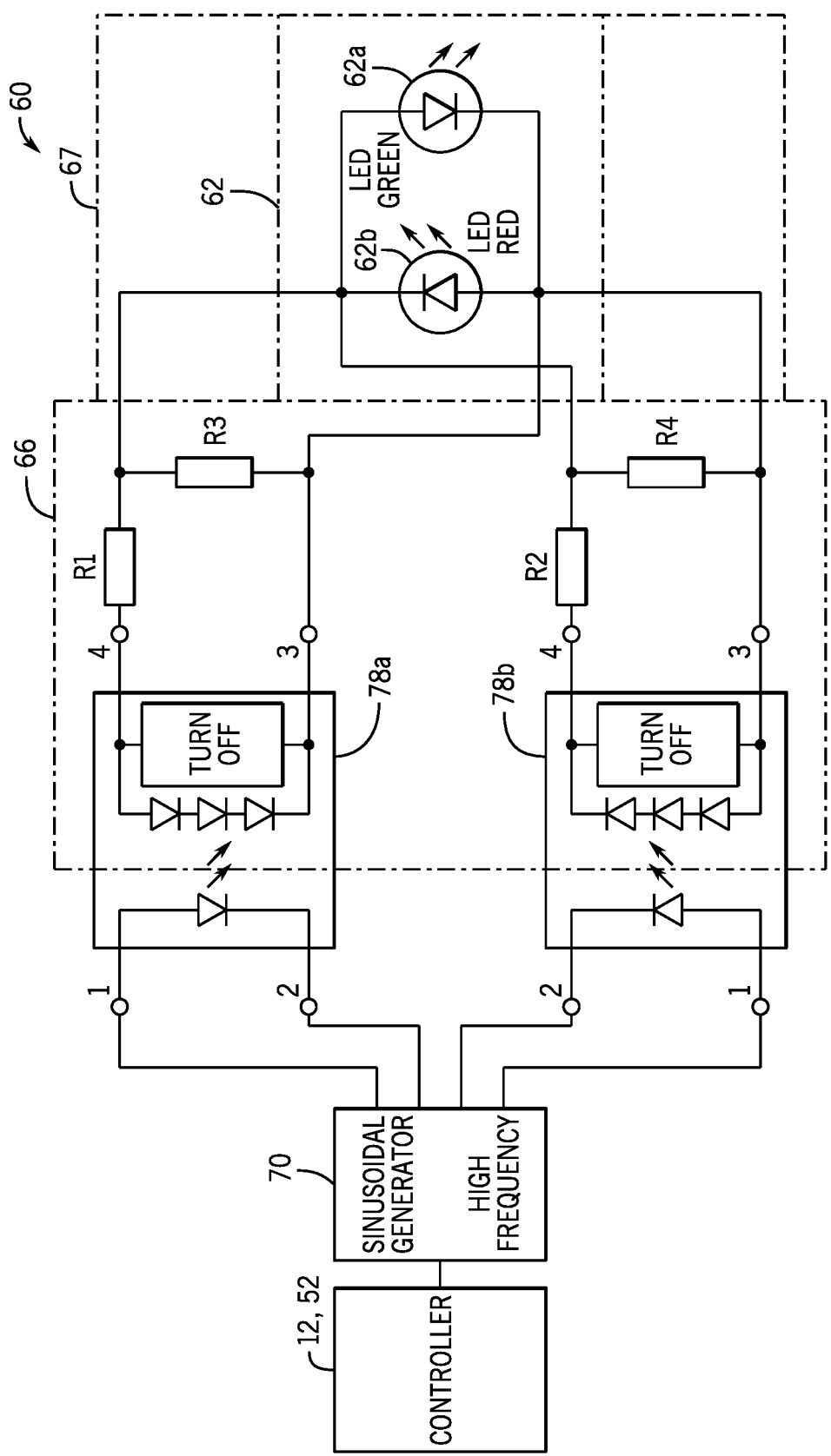

FIG. 6 depicts an embodiment where the status indicator circuit 60 includes a photoelectric effect package 78a, 78b for each indicator light 62a, 62b in the status indicator 62. Each photoelectric effect package 78a, 78 includes a light emitting diode closely coupled with a solar cell. The AC generator 70 is configured to control the LEDs of each photoelectric effect package 78a, 78b to control illumination of each of the indicator lights 62a, 62b. Activation and/or the frequency of the AC generator is controlled by the controller 12, 52. In an alternative embodiment, each photoelectric effect package 78a, 78b can be controlled directly by the controller 12, 52 and the generator is be eliminated. Turning on the LED(s) activates the respective solar cell, which drives current to the respective indicator light 62a, 62b to indicate the operation mode of the power supply device 47.

Figure 7:
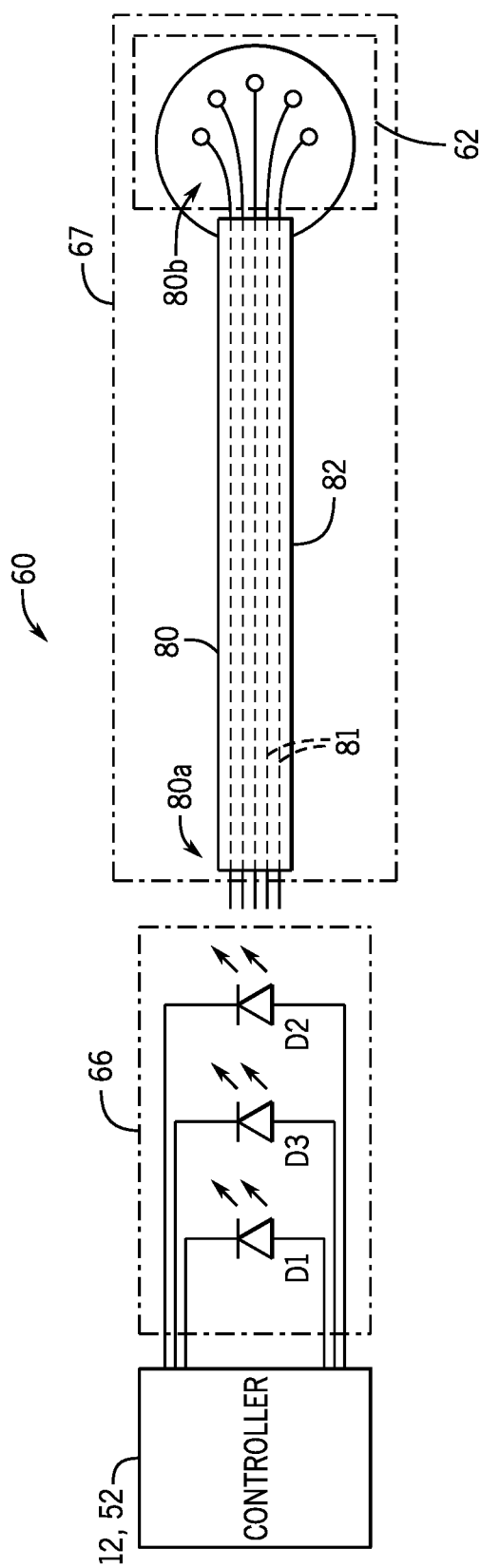

FIG. 7 depicts another embodiment of a status indicator circuit 60 that includes a fiber optic cable 80 running the length of the cord and terminating at the status indicator 62 at or adjacent to the plug end. The status indicator circuit 60 includes multiple LEDs D1-D3 in the control section 66, which are separately illuminable and controlled by the controller 12, 52. The LEDs D1-D3 may be differently colored from one another and illuminated by the controller 12, 52 based on the operation mode of the power supply device 47. A device end 80a of the fiber optic cable 80 is positioned to receive light from the LEDs D1-D3. The cable 80 includes fiber optic strands 81 in a casing 82 such that the cable 80 efficiently transmits the light to the status indicator 62 at or adjacent to the plug end such that it illuminates to indicate the operation mode of the power supply device 47. In the depicted embodiment, a single cable 80 runs the length of the cord 20, 53 and is configured to transmit the light from all diodes D1-D3. Other embodiments may include two LEDs or may include more than three LEDs and may include two or more fiber optic cables in the cord 20, 53.

Figure 8:
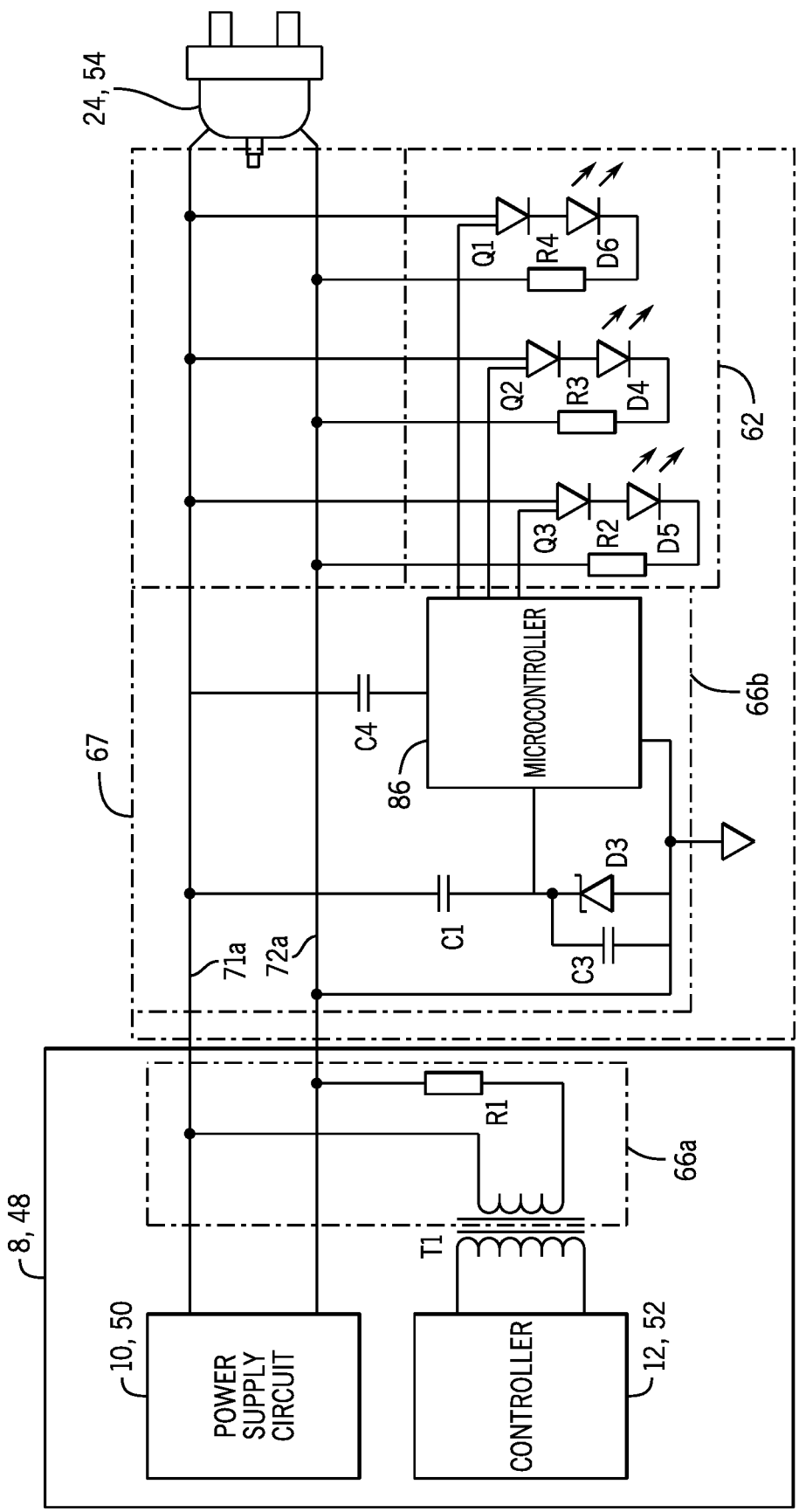

FIG. 8 depicts another embodiment of a status indicator circuit 60 that utilizes an "ethernet over power" strategy where control signal is communicated over the power conductors by encoding it on top of the power signal (e.g., on top of the 60 Hz signal of certain mains electricity standards). For example, the power conductors 30-31 conducting power from the plug end 24 to the charger 7 may be utilized to communicate a control signal from a first control section 66a at the device end to a second control section 66b at or adjacent to the plug end 24, 54. The controller 12, 52 in the device housing 8, 48 is configured to transmit the control signal via transformer T1 to the power conductors 71a and 72a. Resistor R1 separates the AC lines to prevent shorting. The control signal, which is based on the operation mode of the power supply device 7, 47, is received by microcontroller 86 comprising part of the second control section 66b at or adjacent to the plug end 24, 54. The microcontroller 86 is powered by the AC power conductors 71a, 72a via capacitor C1 and diode D3 in parallel with capacitor C3, which is a large capacitor. The microcontroller 86 receives the control signal, which is filtered and isolated via capacitor C4, and is configured to decode the control signal and to turn on the corresponding LED D4-D6 in the status indicator 62 based on the operation mode. In the depicted embodiment the status indicator 62 includes three LEDs D4-D6 which may each be a different color from one another. Three thyristors Q1-Q3 are positioned to control current flow to the LEDs D4-D6, which are positioned in series with respective resistors R2-R4. In other embodiments, Q1-Q3 may be a triac dimmer or a triode. In still other embodiments, the status indicator may include just two LEDs or may include more than three LEDs. The status indicator 62 may be potted in plastic and embedded in or connected to the housing of the plug end 24, 52 such that it can operate without electrical isolation from the power conductors 71a and 72a.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A marine battery charger system configured to be installed on a marine vessel to charge a marine battery, the marine battery charger system comprising:
   a housing;
   a charging circuit in the housing configured to receive AC power and to distribute DC power to charge the marine battery;
   a cord having a plug end configured to engage an AC power outlet and to transmit the AC power from the AC power outlet to the charging circuit;
   a controller configured to control a charging operation mode of the charging circuit; and
   a status indicator located at or adjacent to the plug end of the cord, wherein the status indicator is configured to be controlled to indicate the charging operation mode of the charging circuit.

2. The system of claim 1, wherein the charging operation mode includes a bulk mode, an absorption mode, or a float mode, and wherein the status indicator is configured to variously illuminate to indicate when the charging circuit is operating in the bulk mode, the absorption mode, or the float mode.

3. The system of claim 1, wherein the status indicator includes at least two LEDs in the plug end that are separately illuminable to indicate at least two charging operation modes of the charging circuit.

4. The system of claim 3, wherein the at least two charging operation modes include bulk mode and float mode.

5. The system of claim 1, further comprising a status indicator circuit including the status indicator in the plug end, a control section in the housing configured to control illumination of the status indicator, and at least two wires connecting between the control section and the status indicator.

6. The system of claim 5, wherein the status indicator circuit is electrically isolated from the AC power from the AC power outlet and from the charging circuit.

7. The system of claim 6, further comprising an alternating current generator in the housing and configured to power the status indicator circuit via a transformer.

8. The system of claim 5, wherein the status indicator includes a first indicator light and a second indicator light, and further comprising a first switching device configured to allow current to flow through the status indicator circuit in a first direction to illuminate the first indicator light and a second switching device configured to allow current to flow through the status indicator circuit in a second direction to illuminate the second indicator light.

9. The system of claim 8, wherein the first and second switching devices are in the control section of the status indicator circuit located in the housing.

10. The system of claim 8, wherein the first switching device and the second switching device are each an optoisolator controlled by the controller.

11. The system of claim 8, wherein the controller is further configured to control the first switching device to illuminate the first indicator light to indicate a first charging operation mode, control the second switching device to illuminate the second indicator light to indicate a second charging operation mode, and to control both the first and second switching devices to illuminate both the first and second indicator lights to indicate a third charging operation mode.

12. The system of claim 11, wherein the first indicator light is a first color and the second indicator light is a second color, and wherein the third charging operation mode is indicated by rapidly cycling between illuminating the first indicator light and the second indicator light such that it appears as a third color.

13. A power supply system configured to distribute power from a power source, the power supply system comprising:
    a power supply device in a housing and configured to distribute electrical power received from the power source;
    a cord having a plug end and a length extending from the plug end to a device end configured to connect to the housing, the cord including main power conductors extending the length of the cord and configured to conduct power to or from the power supply device;
    a status indicator circuit that is electrically isolated from the main power conductors and extends along the length of the cord, the status indicator circuit including at least a first indicator light and a second indicator light located at or adjacent to the plug end of the cord; and
    a controller configured to control the status indicator circuit to selectively illuminate the first indicator light when the power supply device is operating in a first operation mode and to illuminate the second indicator light when the power supply device is operating in a second operation mode.

14. The system of claim 13, wherein the status indicator circuit includes a first optoisolator selectively controllable by the controller to illuminate the first indicator light and a second optoisolator selectively controllable by the controller to illuminate the second indicator light.

15. The system of claim 14, wherein controller and the first and second optoisolators are located in the housing of the power supply device.

16. The system of claim 14, wherein a transformer supplies AC power to the status indicator circuit, and wherein the status indicator circuit is configured such that simultaneously activating the first optoisolator and the second optoisolator causes the first indicator light and the second indicator light to alternately illuminate at a frequency of the AC power.

17. The system of claim 16, wherein the controller is configured to activate the first and second optoisolators to indicate that the power supply device is operating in a third operation mode.

18. The system of claim 13, further comprising an alternating current (AC) generator in the power supply device housing and configured to power the status indicator circuit via a transformer.

19. The system of claim 18, wherein the AC generator is configured to be controlled by the controller, and wherein the controller is configured to power off the AC generator to turn off the status indicator circuit.

20. The system of claim 13, wherein the power supply system is a battery charger system configured to charge a battery, and wherein the first operation mode is a bulk mode delivering a bulk charge to the battery and the second operation mode is a float mode delivering a float charge to the battery.

21. The system of claim 20, wherein the status indicator circuit is configured to illuminate the first indicator light to indicate that the battery charger system is operating in a bulk mode and to illuminate the second indicator light to indicate that the battery charger system is operating in a float mode.

22. The system of claim 21, wherein the status indicator circuit is controllable to cycle between illuminating the first indicator light and the second indicator light to indicate that the battery charger system is operating an absorption mode.

23. The system of claim 13, wherein the power supply system is an inverter.

\* \* \* \* \*